(12) United States Patent
Snyder et al.

(10) Patent No.: US 9,917,871 B2
(45) Date of Patent: Mar. 13, 2018

(54) OPTIMIZING MEDIA BITRATE WITH EXPLICIT NETWORK FEEDBACK ON ONE CLIENT ONLY

(71) Applicant: Cisco Technology, Inc., San Jose, CA (US)

(72) Inventors: Jon M. Snyder, Portland, OR (US); Pål-Erik Martinsen, Ås (NO); Dan Tan, Sunnyvale, CA (US); Herbert Wildfeuer, Los Altos, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 15/090,729

(22) Filed: Apr. 5, 2016

(65) Prior Publication Data
US 2017/0289225 A1 Oct. 5, 2017

(51) Int. Cl.
*H04L 1/00* (2006.01)
*H04L 29/06* (2006.01)
*H04L 29/12* (2006.01)
*H04L 12/801* (2013.01)

(52) U.S. Cl.
CPC ............ *H04L 65/601* (2013.01); *H04L 47/12* (2013.01); *H04L 61/2575* (2013.01); *H04L 65/403* (2013.01); *H04L 65/4069* (2013.01)

(58) Field of Classification Search
None
See application file for complete search history.

(56) References Cited

U.S. PATENT DOCUMENTS

| 2008/0259943 A1* | 10/2008 | Miyajima | H04L 29/12528 370/401 |
| 2012/0019609 A1* | 1/2012 | Chang | H04M 7/0057 348/14.01 |
| 2015/0304179 A1* | 10/2015 | Huang | H04L 43/06 709/224 |
| 2016/0043844 A1* | 2/2016 | Meylan | H04L 5/0048 370/315 |

(Continued)

OTHER PUBLICATIONS

Rosenberg et al. "Session Traversal Utilities for NAT (STUN)" Network Working Group; Oct. 2008; pp. 1-51.

(Continued)

*Primary Examiner* — Bob Phunkulh
(74) *Attorney, Agent, or Firm* — Parker Ibrahim & Berg LLC; James M. Behmke; Stephen D. LeBarron

(57) ABSTRACT

In one embodiment, a first device in a network sends a Session Traversal Utilities for Network Address Translation (STUN) binding request towards an endpoint device of a media session between the first and endpoint devices. The binding request includes one or more network attribute fields. The first device receives a binding response from an intermediate node between the first and endpoint devices in the network, in response to sending the binding request towards the endpoint device. The intermediate node inserted the one or more network attribute fields into the binding response. The received binding response includes one or more metrics for the media session in the one or more network attribute fields. The first device adjusts one or more bitrates of the media session based on the one or more metrics for the media session in the received binding response.

20 Claims, 10 Drawing Sheets

(56) References Cited

U.S. PATENT DOCUMENTS

2016/0380789 A1* 12/2016 Gunnalan ........... H04L 61/2589
    709/228
2016/0380966 A1* 12/2016 Gunnalan ............... H04L 65/60
    709/226
2016/0380967 A1* 12/2016 Moore ................ H04L 65/1069
    709/217

OTHER PUBLICATIONS

J. Rosenberg "Interactive Connectivity Establishment (ICE): A Protocol for Network Address Translator (NAT) Traversal for Offer/Answer Protocols" Internet Engineering Task Force (IETF); Apr. 2010; pp. 1-117.

Wenger et al. "Codec Control Messages in the RTP Audio-Visual Profile with Feedback (AVPF)" Network Working Group; Feb. 2008; pp. 1-64.

Martinsen et al. "Differentiated priorities and Status Code-points Using Stun Signalling (DISCUSS) draft-martinsen-tram-discuss-02" TRAM; Feb. 12, 2015; pp. 1-16.

* cited by examiner

OPTIMIZING MEDIA BITRATE WITH EXPLICIT NETWORK FEEDBACK ON ONE CLIENT ONLY

TECHNICAL FIELD

The present disclosure relates generally to computer networks, and, more particularly, to optimizing a media bitrate when explicit network feedback is available on only one client.

BACKGROUND

Various forms of media sessions may exist in a communication network. For example, a media session may support conferencing (e.g., with multiple speakers or presenters), content streaming (e.g., from a single source to an audience), fax communications, application sharing, and the like. Such a session may convey media of a particular type, such as audio or video, or, alternatively, be a multimedia session that conveys multiple forms of media at the same time (e.g., a video conference with audio, etc.).

Quality of Experience (QoE) is of utmost importance in real-time communications such as media sessions. For example, network congestion can lead to an increase in jitter and/or dropped packets, thereby causing a video stream to appear choppy or frozen to an end user. To ensure an acceptable QoE for a media session, the devices involved in the session may use explicit feedback from the network. Notably, the devices may adjust one or more parameters of the media session based on the network feedback, to help minimize congestion and other events that reduce the QoE of the session.

Ensuring QoE of a media session is relatively straightforward when each endpoint of the media session is able to receive explicit feedback from the network. For example, if both endpoint devices support the same feedback mechanism, each device can adjust its media bitrate, accordingly. However, situations may also arise in which neither or only one of the endpoints supports the feedback mechanism.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first device in a network sends a Session Traversal Utilities for Network Address Translation (STUN) binding request towards an endpoint device of a media session between the first and endpoint devices. The binding request includes one or more network attribute fields. The first device receives a binding response from an intermediate node between the first and endpoint devices in the network, in response to sending the binding request towards the endpoint device. The intermediate node inserted the one or more network attribute fields into the binding response. The received binding response includes one or more metrics for the media session in the one or more network attribute fields. The first device adjusts one or more bitrates of the media session based on the one or more metrics for the media session in the received binding response.

In further embodiments, an intermediate node along a network path for a media session between first and second endpoint devices receives a binding response sent by the second endpoint device in response to receiving a Session Traversal Utilities for Network Address Translation (STUN) binding request from the first endpoint device. The intermediate node determines that the binding response does not include the one or more network attribute fields of the binding response. The intermediate node generates a binding response that includes one or more metrics for the media session in the one or more network attribute fields, based on a determination that the binding response from the second endpoint device does not include the one or more network attribute fields. The intermediate node sends the generated binding response to the first endpoint device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1A:
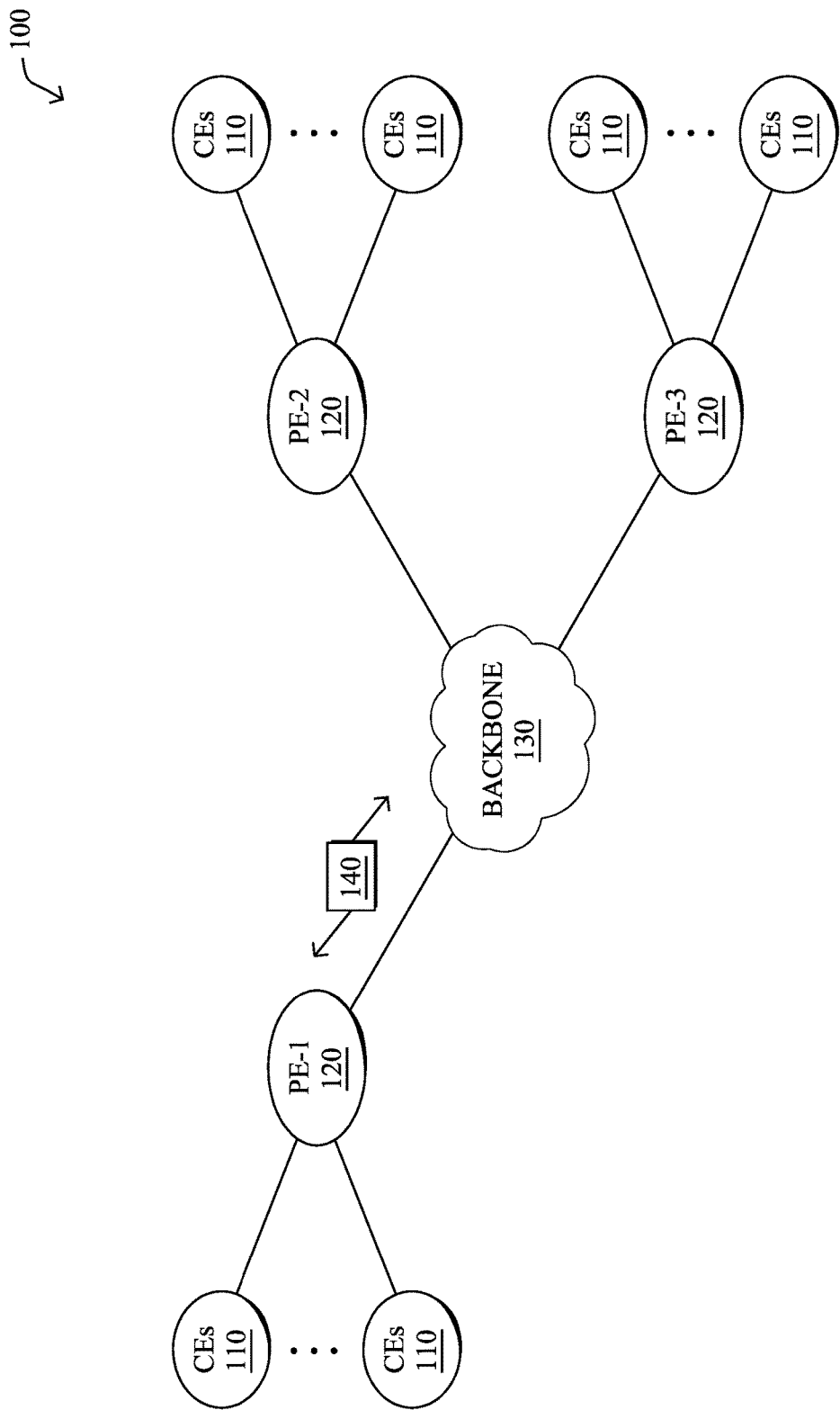
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
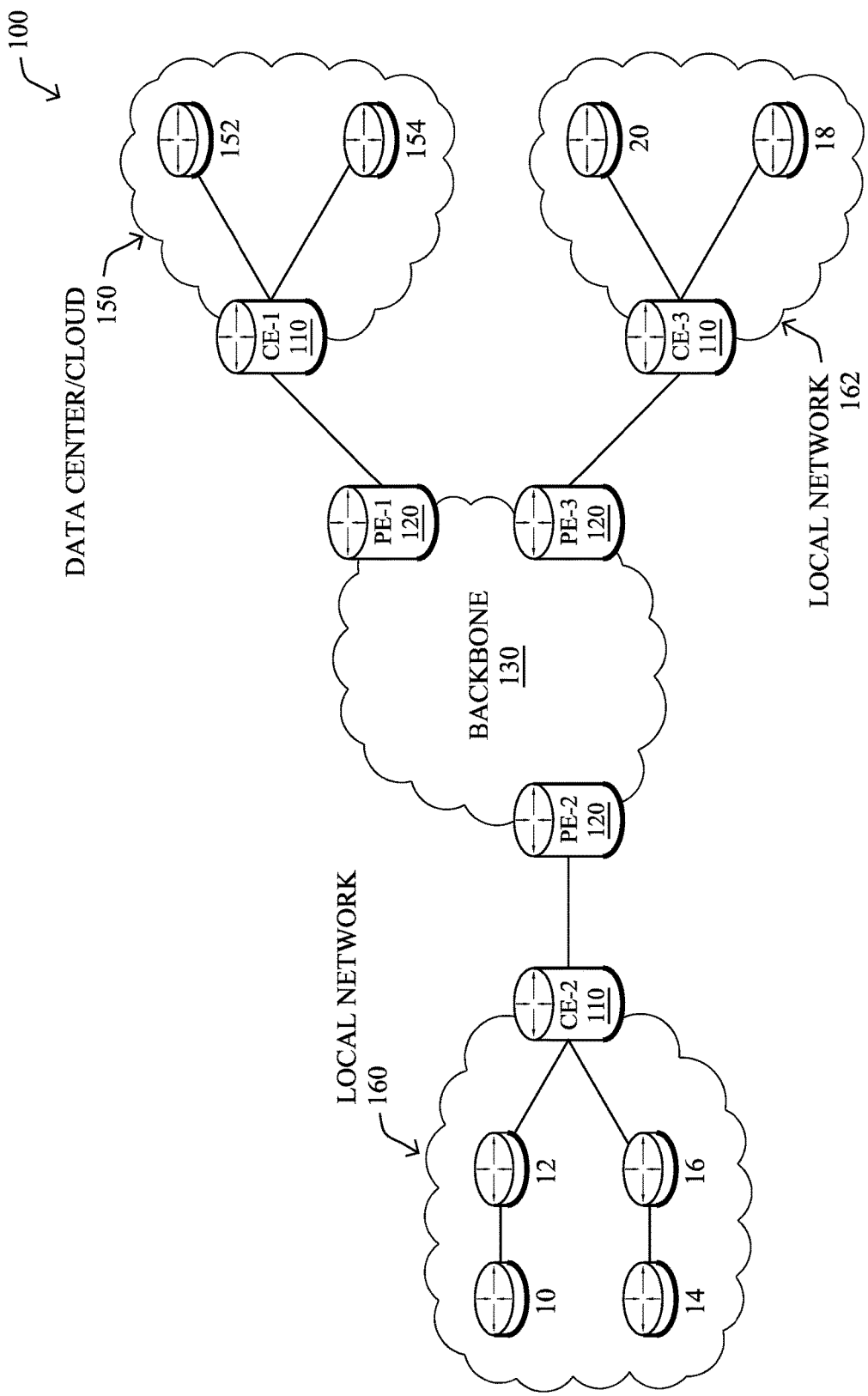

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

Figure 2:
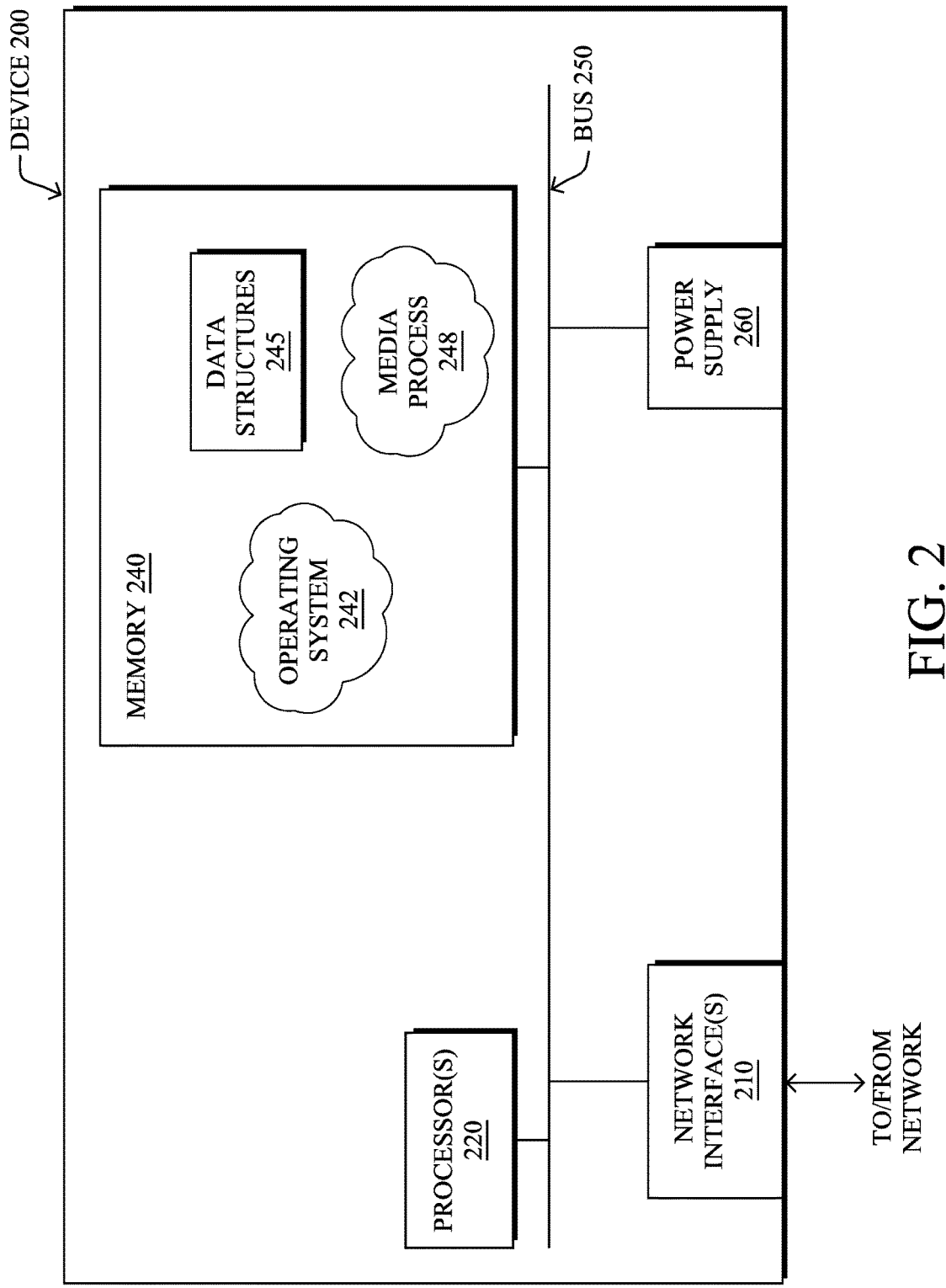
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices described herein. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processes/services may comprise a media process 248, as described herein, which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Generally, media process 248 may be configured to enable a media session between two or more devices in a network (e.g., between device 200 and another endpoint device, between other endpoint devices, etc.). For example, in some embodiments, media process 248 may be configured to provide audio and/or video media data to one or more remote devices as part of a media session. Media process 248 may also be configured to present any received media data to a user interface device such as a display, speaker, etc. that is integrated with device 200 or otherwise in communication therewith.

Figure 3:
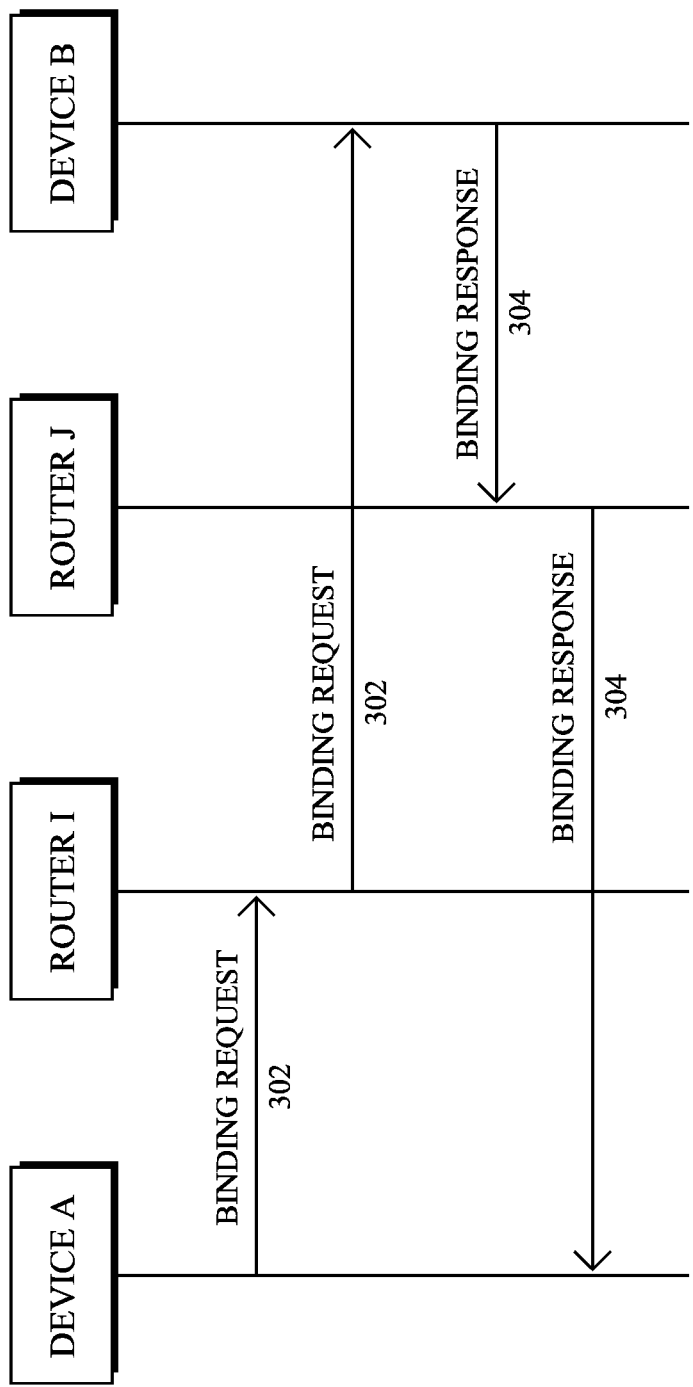
FIG. 3 illustrates an example binding request/response exchange.

Media process 248 may use any number of different techniques, to meet the Quality of Experience (QoE) requirements of a given media session. An example of such a technique is illustrated in FIG. 3, according to various embodiments. As shown in FIG. 3, assume that two endpoint devices A and B are, or will be, participants in a media session. The corresponding network path for the session may include any number of intermediate devices such as illustrative routers I and J shown. As would be appreciated, the network path for the media session may comprise any number of access points, gateways, routers, switches, servers, or the like.

In one embodiment, endpoint device A may send a network address translation (NAT) binding request 302 towards the other endpoint device B, to gather and convey feedback about the network. For example, the Internet Engineering Task Force draft entitled "Differentiated prIorities and Status Code-points Using Stun Signaling (DISCUSS)" by Martinsen et al., which is hereby incorporated by reference, discloses a set of network attributes that can be added to a Session Traversal Utilities for NAT (STUN) message. Details regarding STUN messages can be found in the IETF request for comments (RFC) 5389 entitled "Session Traversal Utilities for NAT (STUN)" by Rosenberg et al., the contents of which are incorporated by reference. Generally, a networking device can use STUN messaging to perform a number of different functions such as identifying address/port allocation information from a NAT traversal, verifying endpoint connectivity, and maintaining NAT bindings.

DISCUSS defines a number of network attribute fields that a client device can include in a STUN-based message or the like. Particularly, DISCUSS defines the following network attributes that a STUN message can convey:

1.) Stream-Type—

This attribute indicates the type of data conveyed during a session between endpoint devices. For example, the STREAM-TYPE attribute may indicate that the flow traffic includes audio, video, application data, or other forms of data. In some cases, the STREAM-TYPE may also indicate the interactivity of the stream (e.g., whether the media session is a broadcast session, one-way stream, etc.).

2.) Bandwidth-Usage—

This attribute can convey metrics regarding the bandwidth usage of the media stream. For example, the BANDWIDTH-USAGE attribute may indicate the average and/or maximum sustained bandwidth of the media stream.

3.) Stream-Priority—

This attribute can include priority information for the stream such as a priority value, a delay sensitivity identifier, a session identifier, etc.

4.) Network-Status—

This attribute can include information regarding congestion experienced by the devices associated with the flow, a count of nodes/devices that support DISCUSS, a maximum upstream bitrate supported by the router for the 5-tuple associated with the flow in the upstream direction, a maximum downstream bitrate supported by the router for the 5-tuple of the flow in the downstream direction, etc.

5.) Sub-Stream-Type/Sub-Stream-Priority—

These attributes may be similar to the STREAM-TYPE and STREAM PRIORITY attributes described above, but for a particular sub-stream of the media session.

During operation, device A shown in FIG. 3 may send a binding request 302 towards device B. For example, binding request 302 may be a STUN-based binding request that includes any, or all, of the DISCUSS-based attribute fields described above. For example, device A may set the STREAM-TYPE, BANDWIDTH-USAGE, and STREAM-PRIORITY attributes for the media stream and a null value for the NETWORK-STATUS attribute. In response to receiving binding request 302, Router I may inspect binding request 302, update the NETWORK-STATUS attribute accordingly, and forward binding request 302 towards endpoint device B.

On receipt of binding request 302, endpoint device B may generate a corresponding binding response 304. In some cases, device B may include the NETWORK-STATUS attribute from binding request 302 in binding response 304, prior to sending binding response 304 back towards endpoint device A. On receipt of binding response 304 from endpoint device B, router J (e.g., the first DISCUSS-enabled router in the downstream direction) inspects binding response 304, adjusts the NETWORK-STATUS attribute if needed, and forwards binding response 304 on towards endpoint device A.

Once endpoint device A receives binding response 304, device A may extract the DISCUSS-based attributes from the message. For example, the NETWORK-STATUS attribute may indicate the maximum upstream and downstream bandwidths supported by the nodes along the path. In turn, device A can take any number of appropriate actions based on this information, to ensure that the QoE of the media session is optimized.

While the mechanisms described with respect to FIG. 3 allow endpoint devices A and B to obtain feedback from the network regarding a media session, other situations are also possible. Notably, not every device in a network may support DISCUSS or a similar mechanism. This is likely to be the case during a deployment, as some endpoints may be upgraded before others. The lack of support for a network feedback mechanism is especially critical in the case of wireless deployments, since the downstream direction, e.g., from access point (AP) to client, often has more contention for airtime than the upstream direction. Furthermore, there may be some devices along the media path that restrict STUN-based DISCUSS messages. In this scenario, the endpoint may behave as if only one of the endpoints supports receiving network feedback. Additionally, nodes along the media path may implement security techniques that prevent network-related metadata from being leaked along the path. Thus, a number of situations exist in which only one client in a media session supports a network feedback mechanism.

Optimizing Media Bitrate with Explicit Network Feedback on One Client Only

The techniques herein allow for the optimization of a media session using network feedback in cases where only one of the media clients supports the network feedback mechanism. In some aspects, if an endpoint device does not support the feedback mechanism, an intermediate node along the media path may supply the information on its behalf to the other endpoint device. In turn, the other endpoint device may use the supplied information to make adjustments to the media session, locally and/or by sending an adjustment request to the opposing endpoint device (e.g., by requesting that the other endpoint limit its bandwidth).

Specifically, according to one or more embodiments of the disclosure as described in detail below, a first device in a network sends a Session Traversal Utilities for Network Address Translation (STUN) binding request towards an endpoint device of a media session between the first and endpoint devices. The binding request includes one or more network attribute fields. The first device receives a binding response from an intermediate node between the first and endpoint devices in the network, in response to sending the binding request towards the endpoint device. The intermediate node inserted the one or more network attribute fields into the binding response. The received binding response includes one or more metrics for the media session in the one or more network attribute fields. The first device adjusts one or more bitrates of the media session based on the one or more metrics for the media session in the received binding response.

Illustratively, the techniques described herein may be performed by hardware, software, and/or firmware, such as in accordance with the media process 248, which may contain computer executable instructions executed by the processor 220 (or independent processor of interfaces 210) to perform functions relating to the techniques described herein. For example, the techniques herein may be treated as extensions to conventional protocols, such as the various wireless communication protocols, and as such, may be processed by similar components understood in the art that execute those protocols, accordingly.

Operationally, when one endpoint of a media session supports an explicit network feedback mechanism (e.g., DISCUSS messaging based on STUN), but the opposing endpoint does not, the supporting client device may not receive responses needed to adjust its transmission rate. Similarly, the non-supporting client device will also lack the information needed to adjust its own transmission rate. Accordingly, a mechanism is introduced that allows the endpoint clients and the intermediate networking devices to support these one-sided scenarios, so that both endpoints can tune their respective bitrates.

Figure 4A:
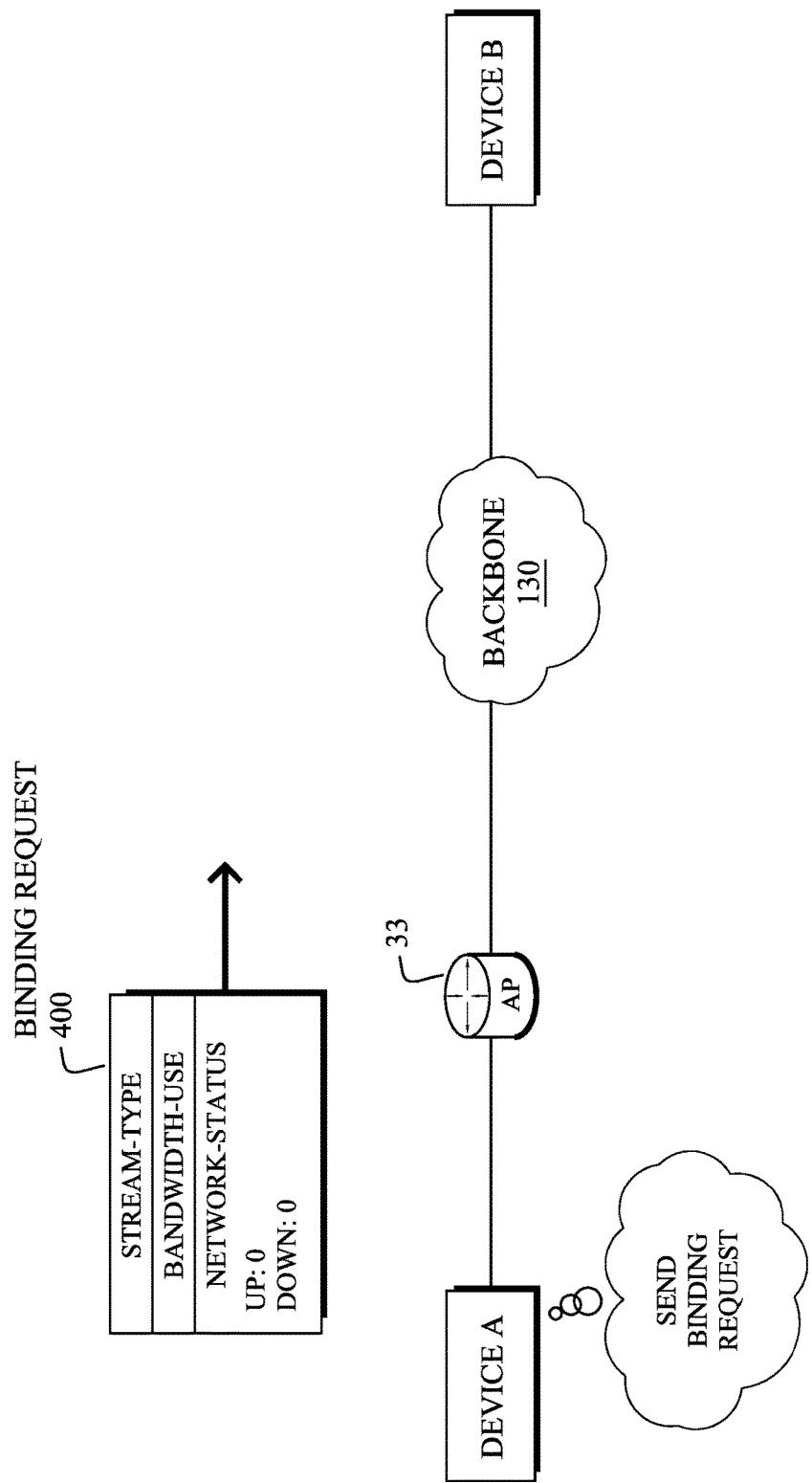
FIGS. 4A-4D illustrate examples of a binding response being adjusted.

FIGS. 4A-4D illustrate examples of a binding response being adjusted, according to various embodiments. As shown in FIG. 4A, assume that devices A and B are endpoints of a media session, but only device A is able to support a network feedback mechanism, such as DISCUSS. Device A is shown directly connected to an intermediate networking device 33, which may be an access point (AP), gateway, or the like. In turn, intermediate networking device 33 may be in communication with endpoint device B via network 130, which may include any number of further intermediate networking devices.

As shown, device A may send a binding request 400 that includes one or more network attribute fields, to gather metrics regarding the handling of the media session by the network. For example, binding request 400 may be a STUN-based binding request that includes DISCUSS attributes such as STREAM-TYPE, BANDWIDTH-USAGE, NETWORK-STATUS, etc. The destination IP address for binding request 400 corresponds to the other endpoint in the call, and the source and destination ports also match those of the media flow. Generally, binding request 400 may be INTEGRITY-protected and include a NETWORK-STATUS attribute that is not INTEGRITY-protected and initialized with zero values for UP and DOWN maximum bandwidths. In some embodiments, binding request 400 may further include an indication that device A wants one-sided DISCUSS support, if device B does not support DISCUSS functionality.

Figure 4B:
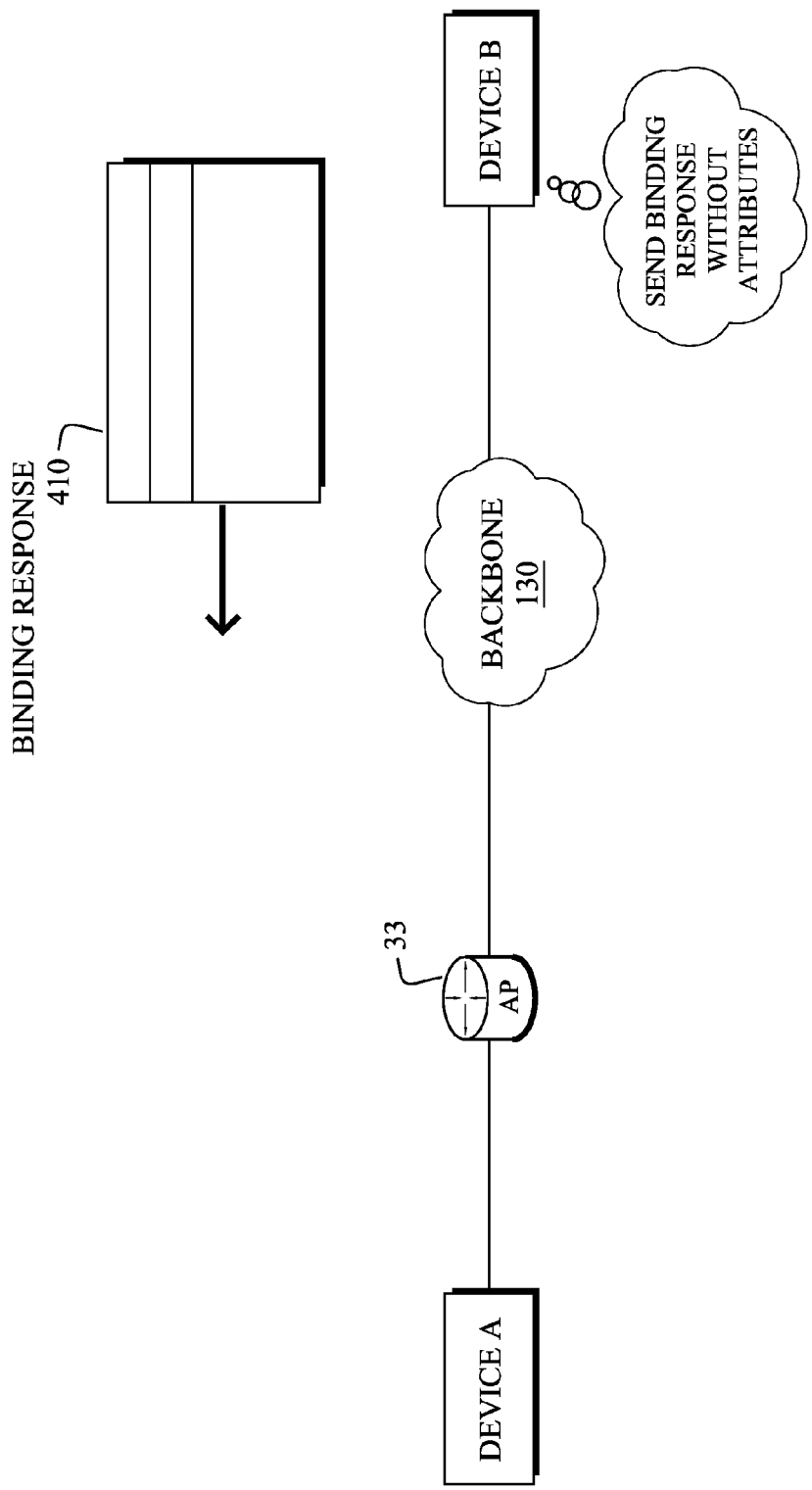

As shown in FIG. 4B, if device B does not support DISCUSS or similar network attributes, it may fail to include these attributes in its binding response. For example, in response to receiving binding request 400, device B may send a STUN-based binding response 410 back towards device A. However, because device B does not support DISCUSS, device B may not include the respective attributes from binding request 400 in binding response 410.

Figure 4C:
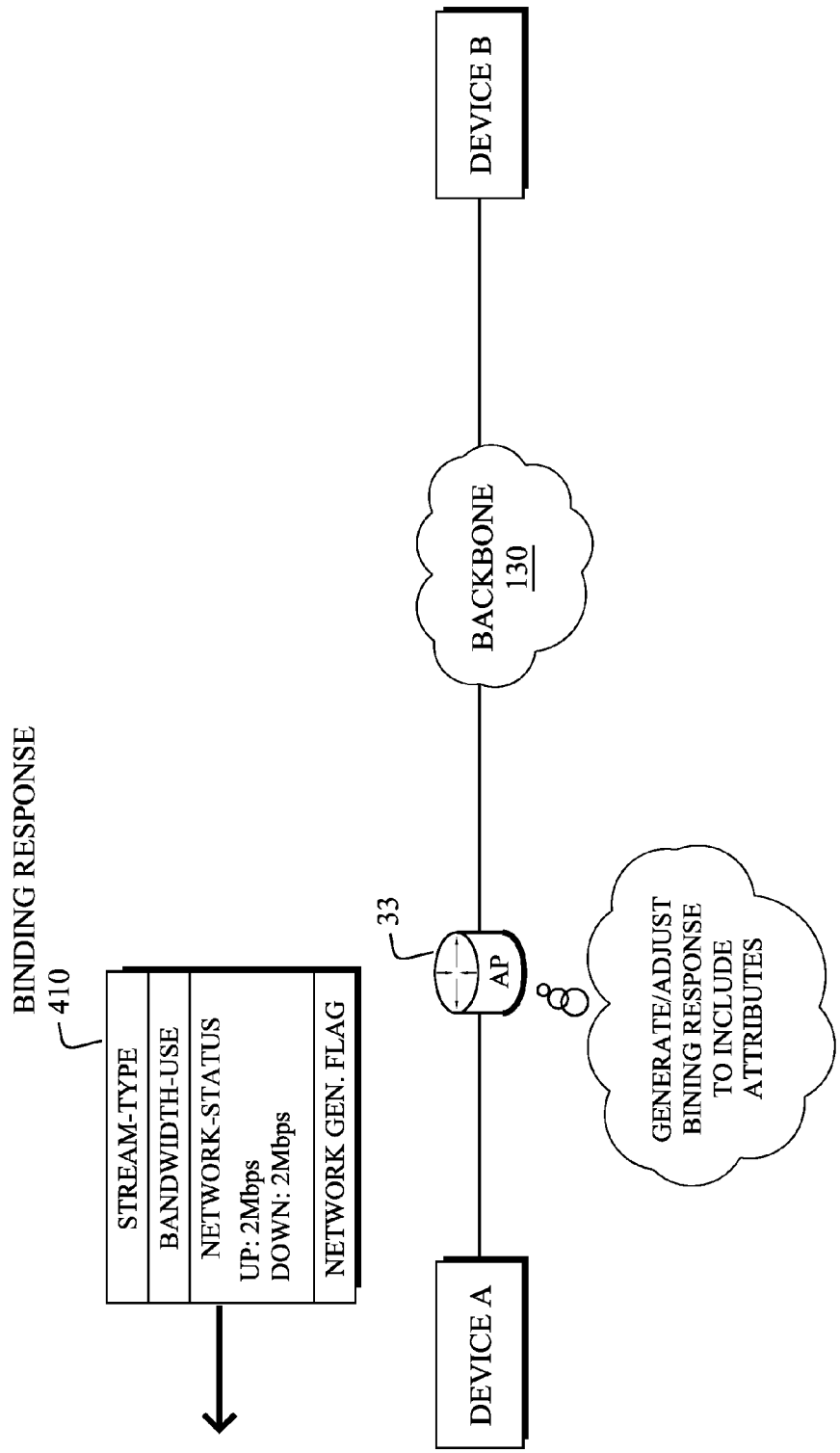

In FIG. 4C, intermediate networking device 33 may assess binding response 410 from device B. In particular, intermediate networking device 33 may determine whether devices A and B support two-sided attribute messaging or one-sided attribute messaging. For example, intermediate networking device 33 may determine that device A supports DISCUSS based on the information included in binding request 400 (e.g., a flag requesting support for unidirectional optimization, etc.). Similarly, intermediate networking device 33 may determine that device B does not support DISCUSS if binding response 410 does not include the expected DISCUSS-based attribute(s).

In various embodiments, intermediate networking device 33 may adjust a DISCUSS-based binding response from an endpoint device, if intermediate networking device 33 determines that the endpoint devices of the media session have only one-sided DISCUSS support. For example, if binding response 410 lacks the expected DISCUSS-based attributes from device B, intermediate networking device 33 may insert the expected fields into binding response 410 before forwarding the generated and modified response on to device A. In one embodiment, intermediate networking device 33 may only adjust a binding response if the destination endpoint device is directly attached to device 33. In another embodiment, device 33 may further insert a flag or other identifier into binding response 410 that indicates that device 33 inserted the requisite attribute field(s) into the response (e.g., that the metrics included in the response were provided by the network, not the other endpoint device B).

Spoofed binding response 410 sent by intermediate networking device 33 may include any, or all, of the network attributes that device B would otherwise include in response 410 if device B supported DISCUSS or a similar mechanism. For example, intermediate networking device 33 may match the STREAM-TYPE, BANDWIDTH-USAGE, etc. attributes from binding request 400 to binding response 410 based on the endpoint devices involved in the exchange. In addition, intermediate networking device 33 may include other metrics, such as the maximum upstream and/or downstream bandwidth of the media session, in the NETWORK-STATUS attribute or the like.

Figure 4D:
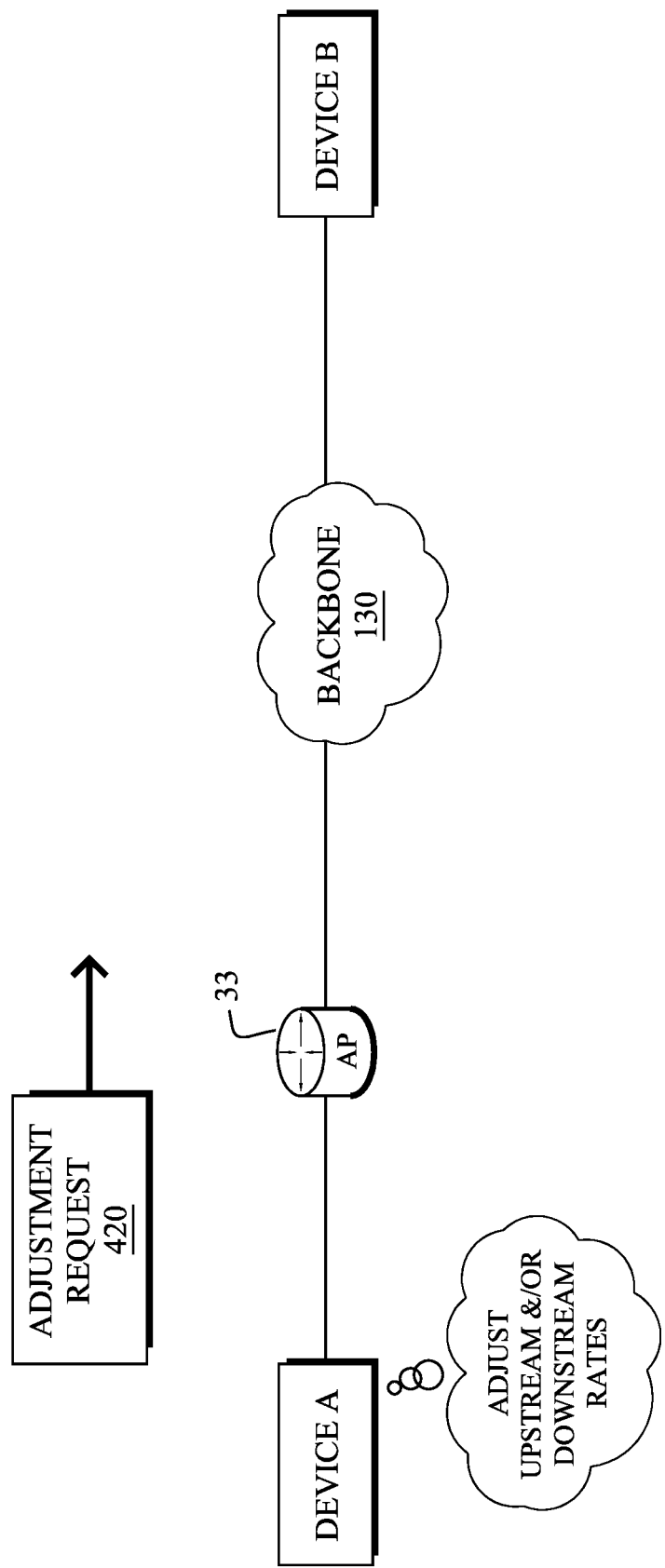

As shown in FIG. 4D, when endpoint device A receives binding response 410, endpoint device A may first perform a normal binding response check, such as the standard STUN response checks. If there is no outstanding transaction, device A may ignore binding response 410. Otherwise, endpoint device A may process any DISCUSS-based or similar attributes in binding response 410. Doing so will provide endpoint device A with "hard" values regarding the available upstream and downstream bandwidth capacities.

Based on the metrics included in the network attributes of binding response 410, endpoint device A may make any number of adjustments to the media session, in an attempt to optimize the QoE of the session. For example, endpoint device A may adjust its own transmission rate for the media session, based on the reported maximum bandwidth metrics in the NETWORK-STATUS attribute of binding response 410. In some cases, other delay sensing mechanisms may cause endpoint device A to adjust its transmission rate even lower than that of the bandwidth reported via binding response 410. For example, if endpoint device A also received Temporary Maximum Media Stream Bit Rate (TM- MBR) or MARI feedback, this feedback may override the DISCUSS-based rate adjustment to be lower. However, in such cases, the adaptation ceiling may still be set as the rate indicated in the received DISCUSS NETWORK-STATUS attribute.

If binding response 410 indicates that it was network-generated (e.g., generated by an intermediate node between endpoint devices A and B), endpoint A also has knowledge that endpoint device B does not support DISCUSS or a similar reporting mechanism. In various embodiments, endpoint device A may still affect the transmission rate of endpoint device B using a different mechanism. For example, as shown, endpoint A may send an adjustment request 420 towards device B, to cause device B to adjust its own transmission rate. Particularly, device A may determine an appropriate maximum transmission rate for device B based on the feedback metrics included in binding response 410 and, in turn, send adjustment request 420 to indicate this rate. In various embodiments, adjustment request 420 may conform to another protocol that can also influence media bitrates such as TMMBR or the like. Consequently, both endpoint devices A and B will adjust their bitrates according to the feedback metrics from the network, even if endpoint device B does not support the feedback mechanism itself.

Endpoint device A may repeat the above process any number of times during a media session, to account for changing network conditions. For example, endpoint device A may send binding requests at a specific interval (e.g., every 1000 ms, etc.), to acquire more up-to-date feedback metrics from the network. In another embodiment, events such as delay sensing may also trigger device A to send a new request for feedback. This can be particularly important in some WiFi-based implementations, which sometimes demonstrate premature rate adaptations caused by their delay sensing mechanisms. In other words, the endpoint device can use the techniques herein to verify that a rate adjustment is needed, if its delay sensing mechanism indicates a delay.

Endpoint device A may also perform a number of security-related functions, to ensure that adjustments to the media sessions are not caused by malicious or erroneous reasons. In some embodiments, endpoint device A may compare any DISCUSS-based feedback, or feedback from a similar mechanism, to any other information that endpoint device A has with respect to bandwidth. For example, if endpoint device A also uses a delay sensing mechanism (e.g., TMMBR, etc.) to initiate rate adjustments, endpoint device A may cross-verify the information from the two mechanisms before initiating an adjustment. Further, networking devices (e.g., intermediary networking device 33, etc.) between the endpoint devices may only employ the one-sided feedback mechanism in instances where an endpoint device specifically requests this functionality (e.g., as part of a binding request).

In another embodiment, the endpoint device may maintain the transaction (e.g., a STUN transaction) for a period of time after receiving a binding response, to further protect against malicious nodes between the endpoint device and the intermediary networking device. Then, if the endpoint device receives a second binding response while the transaction is still open, the endpoint device may disable any further DISCUSS processing and stop sending binding requests. In particular, the endpoint device may prevent a denial of service (DoS) attack by disabling its feedback processing, if it receives two or more binding responses when only one response is expected.

Figure 5:
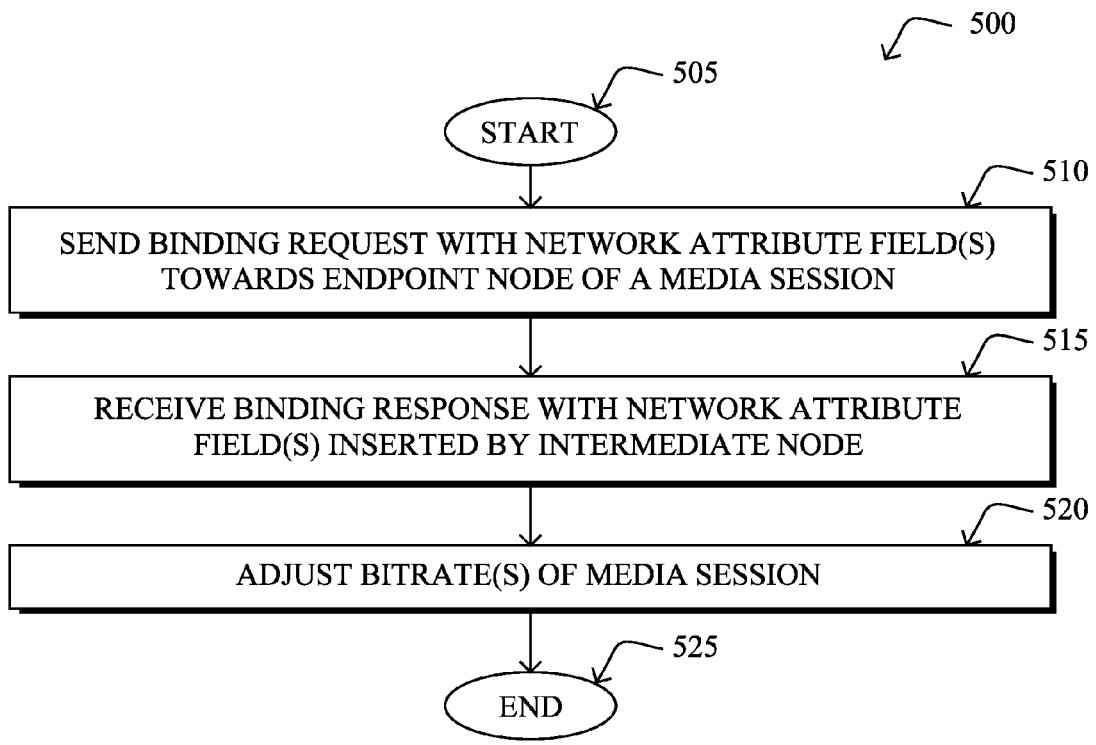
FIG. 5 illustrates an example simplified procedure for adjusting a media bitrate.

FIG. 5 illustrates an example simplified procedure for adjusting a media bitrate, in accordance with one or more embodiments described herein. Generally, procedure 500 may be performed by an endpoint device in a network (e.g., a device 200) that communicates with another endpoint device of a media session between the two endpoint devices. The procedure 500 may start at step 505 and continue on to step 510 where, as described in greater detail above, the first device sends a network address translation (NAT) binding request message towards the other endpoint of the media session. The binding request may include one or more network attribute fields configured to convey metrics and/or other information regarding the network as it relates to the media session. For example, the binding request may include an attribute/field that conveys information regarding the maximum upstream or downstream bandwidth available to the media session. In various embodiments, the binding request may be a STUN-based binding request that includes DISCUSS-based network attributes.

At step 515, as detailed above, the first device may receive a binding response from an intermediate node along the media session path between the first device and the other endpoint device. Notably, if the other endpoint device does not support the network attribute fields (e.g., does not support DISCUSS, etc.), an intermediate networking device may insert any network attribute fields missing from the binding response on behalf of the other endpoint device. For example, if the intermediate device received a binding response that does not include an expected NETWORK-STATUS attribute, the intermediate device may insert this attribute into the response with the corresponding metrics (e.g., bandwidth metrics), before sending the generated response back to the first endpoint device. In some embodiments, the generated response may also include an indication that the metric(s) provided by the response were inserted by the intermediate networking device and not by the other endpoint of the media session.

At step 525, as described in greater detail above, the first endpoint device may adjust one or more bitrates of the media session, based on the metric(s) received via the binding response. In one embodiment, the first endpoint device may adjust its own transmission rate for the media session based on a maximum bandwidth indicated in the received binding response. In another embodiment, if the received binding response indicates that the bandwidth metrics were supplied by an intermediate networking device and not by the other endpoint device, the first endpoint device may also cause the other endpoint device to adjust its own transmission rate. For example, the first endpoint device may send a rate adjustment request to the other endpoint device, to cause the other endpoint to make the required rate adjustments on its end of the media session. Such a request may be a TMMBR message or using any other protocol that is still supported by the other endpoint device. Procedure 500 then ends at step 525.

Figure 6:
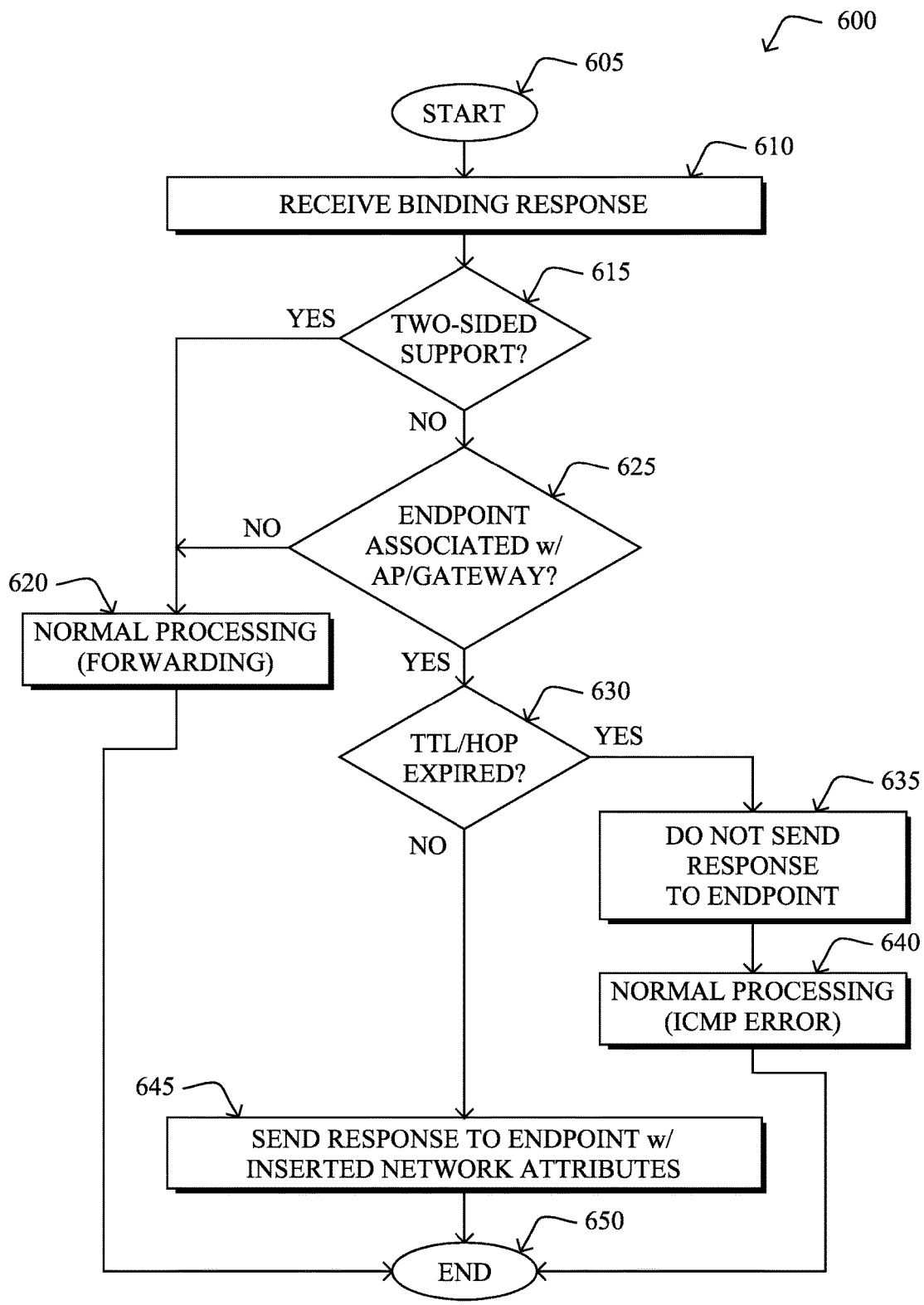
FIG. 6 illustrates an example simplified procedure for adjusting a binding response.

FIG. 6 illustrates an example simplified procedure for adjusting a binding response, in accordance with various embodiments herein. The procedure 600 may be performed, e.g., by a specifically configured networking node (e.g., a router, a wireless access point, a gateway, etc.) disposed at an intermediate location between two endpoint devices of a media session. Procedure 600 starts at step 605 and continues on to step 610 where, as described in greater detail above, the node may receive a binding response from one of the endpoint devices in the media session that is bound for the other endpoint. For example, the node may receive a STUN-based binding response that was sent by an endpoint in response to a binding request from the other endpoint.

At step 615, as detailed above, the intermediate node may determine whether the endpoints of the media session have two-sided support for a feedback mechanism that conveys metrics for the media session through a binding request/response exchange. For example, the node may determine whether the endpoints of the media session both support DISCUSS-based messaging. In some embodiments, the node may base this determination in part on the contents of the received binding response. For example, if endpoint A sent a binding request that includes DISCUSS-based network attributes and the response from endpoint B does not include these attributes, the intermediate node may determine that the endpoints only have one-sided support for the feedback mechanism. If both endpoints support the feedback mechanism, procedure 600 may continue on to step 620. Otherwise, procedure 600 may continue on to step 625.

At step 620, if both endpoints support the feedback mechanism, the intermediate node may simply forward the received binding response on to the destination endpoint. Notably, if the binding response already includes the expected network attributes, the intermediate node may simply forward the binding response to the destination. Procedure 600 then ends at step 650.

At step 625, if only one of the endpoints of the media session supports the feedback mechanism, the intermediate node may then determine whether the destination endpoint of the binding response is directly associated/connected to the intermediate node. For example, an endpoint can be associated with an AP, or may be connected via 802.1x to an Ethernet switch. In order to prevent packet amplification attacks, the intermediate node may only perform the additional steps 630 and 645 of procedure 600 when the intermediate node is communicating directly with the endpoint. If the endpoint is not connected directly to the intermediate node, procedure 600 may continue on to step 620. Otherwise, procedure 600 may continue on to step 630.

At step 620, if the intermediate node is not connected directly to the destination endpoint device, the intermediate node may simply perform normal processing of the received binding response. For example, if the intermediate node receives a STUN-based binding response and is not connected directly to the destination endpoint, the intermediate node may perform the standard STUN processing of the response by simply forwarding the response on to the endpoint. Procedure 600 then ends at step 650.

At step 630, if the intermediate node is connected to the destination endpoint device, the intermediate node may then determine whether the response is expired, based on any time to live (TTL)/hop information associated with the response. If the response is outdated, procedure 600 may continue on to step 635. Otherwise, procedure 600 may continue on to step 645.

At step 635, if the TTL/hop information indicates that the binding response is outdated, the intermediate node may prevent the response from being sent to the destination endpoint device. For example, the intermediate node may simply drop the received binding response and, at step 640, send an ICMP error message. Procedure 600 then ends at step 650.

At step 645, as described in greater detail above, the node may send a generated binding response to the destination endpoint. Generally, the intermediate node may adjust/generate the binding response by including metrics regarding the media session within one or more network attributes inserted into the binding response. For example, if the received binding response does not include DISCUSS-based network attributes, the intermediate node may add such attributes and corresponding metrics to the binding response before sending the response to the destination endpoint. Procedure 600 then ends at step 650.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, allow endpoint devices of a media session to adjust the media session using feedback from the network, even in situations in which only one of the endpoint devices supports the feedback mechanism. For example, if only one endpoint device supports DISCUSS and the other does not, the devices may use the techniques herein to still optimize their media bitrates. In some embodiments, the feedback-enabled endpoint may influence the other endpoint by using other existing mechanisms, such as TMMBR. In another aspect, an AP may perform the techniques herein in "bridge mode," without the need for IP addresses.

While there have been shown and described illustrative embodiments that provide for the adjustment of media bitrates when only one endpoint supports a network feedback mechanism, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of network configurations and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    sending, by a first device in a network, a Session Traversal Utilities for Network Address Translation (STUN) binding request towards an endpoint device of a media session between the first and endpoint devices, wherein the binding request includes one or more network attribute fields;
    receiving, at the first device, a binding response from an intermediate node between the first and endpoint devices in the network, in response to sending the binding request towards the endpoint device, wherein the intermediate node inserted the one or more network attribute fields into the binding response, and wherein the received binding response comprises one or more metrics for the media session in the one or more network attribute fields; and adjusting, by the first device, one or more bitrates of the media session based on the one or more metrics for the media session in the received binding response.

2. The method as in claim 1, wherein the one or more network attribute fields comprises at least one of: a stream type attribute for the media session, a bandwidth usage attribute for the media session, or a network status attribute for the media session.

3. The method as in claim 1, wherein adjusting the one or more bitrates of the media session comprises:

adjusting, by the first device, a transmit bitrate at which the first device sends traffic for the media session.

4. The method as in claim 1, wherein adjusting the one or more bitrates of the media session comprises:

sending, by the first device, a bitrate adjustment request to the endpoint device.

5. The method as in claim 4, wherein the bitrate adjustment request comprises a Temporary Maximum Media Stream Bit Rate (TMMBR) request.

6. The method as in claim 1, wherein the one or more network attribute fields comprise one or more Differentiated Priorities and Status Code-Points Using Stun Signaling (DISCUSS) fields.

7. The method as in claim 1, wherein the received binding response comprises an indication that the one or more metrics for the media session were provided by the intermediate node instead of the endpoint device.

8. The method as in claim 1, wherein the binding request comprises an indication that the intermediate node should insert the one or more network attribute fields into a binding response from the endpoint device, if the endpoint device does not support the one or more network attribute fields.

9. The method as in claim 1, further comprising:

cross-verifying, by the first device, the one or more metrics for the media session included in the binding response with information regarding the media session generated by a delay sensing mechanism.

10. The method as in claim 1, further comprising:

maintaining, by the first device, a STUN transaction for a period of time after receiving the binding response; and detecting, by the first device, a potential network attack based on receipt of a second binding response during the period of time.

11. A method, comprising:

receiving, at an intermediate node along a network path for a media session between first and second endpoint devices, a binding response sent by the second endpoint device in response to receiving a Session Traversal Utilities for Network Address Translation (STUN) binding request from the first endpoint device;

determining, by the intermediate node, that the binding response does not include the one or more network attribute fields included in the binding request; generating, by the intermediate node, a binding response that includes one or more metrics for the media session in the one or more network attribute fields, based on a determination that the binding response from the second endpoint device does not include the one or more metrics; and sending, by the intermediate node, the generated binding response to the first endpoint device.

12. The method as in claim 11, further comprising:

including, by the intermediate node, an indication in the generated binding response that the one or more metrics for the media session were provided by the intermediate node instead of the second endpoint device.

13. The method as in claim 12, wherein the one or more network attribute fields comprise one or more Differentiated Priorities and Status Code-Points Using Stun Signaling (DISCUSS) fields.

14. The method as in claim 11, wherein the generated binding response is generated based further in part on an indication in the binding request that the intermediate node should include the one or more network attribute fields in a binding response from the endpoint device if the second endpoint device does not support the one or more network attribute fields.

15. The method as in claim 11, wherein the generated binding response is generated based further in part on a determination that a time to live (TTL) associated with the binding request has expired.

16. The method as in claim 11, wherein intermediate node is a wireless access point or gateway, and wherein the generated binding response is generated based further in part on a determination that the first endpoint device is directly associated with the wireless access point or gateway.

17. An apparatus, comprising:

one or more network interfaces to communicate with a network;

a processor coupled to the network interfaces and adapted to execute one or more processes; and a memory configured to store a process executable by the processor, the process when executed operable to:

send a Session Traversal Utilities for Network Address Translation (STUN) binding request towards an endpoint device of a media session between the apparatus and the endpoint device, wherein the binding request includes one or more network attribute fields;

receive a binding response from an intermediate node between the apparatus and the endpoint device in the network, in response to sending the binding request towards the endpoint device, wherein the intermediate node inserted the one or more network attribute fields into the binding response, and, wherein the received binding response comprises one or more metrics for the media session in the one or more network attribute fields; and adjust one or more bitrates of the media session based on the one or more metrics for the media session in the received binding response.

18. The apparatus as in claim 17, wherein the one or more network attribute fields comprise one or more Differentiated Priorities and Status Code-Points Using Stun Signaling (DISCUSS) fields.

19. The apparatus as in claim 18, wherein the bitrate adjustment request comprises a Temporary Maximum Media Stream Bit Rate (TMMBR) request.

20. The apparatus as in claim 17, wherein the binding request comprises an indication that the intermediate node should insert the one or more network attribute fields into a binding response from the endpoint device, if the endpoint device does not support the one or more network attribute fields.

* * * * *